US005138369A

United States Patent [19]

Okubo et al.

[11] Patent Number: 5,138,369

[45] Date of Patent: Aug. 11, 1992

[54] MAGNIFICATION ADJUSTING MECHANISM

[75] Inventors: Kenzo Okubo; Kazuya Akura; Masanori Itakiyo, all of Osaka, Japan

[73] Assignee: Mita Industrial Co., Ltd., Osaka, Japan

[21] Appl. No.: 769,807

[22] Filed: Oct. 2, 1991

[30] Foreign Application Priority Data

Oct. 2, 1990 [JP] Japan .................................. 2-265334
Oct. 2, 1990 [JP] Japan .................................. 2-265335

[51] Int. Cl.5 ...................... G03B 27/52; G03B 27/34; G03B 27/40

[52] U.S. Cl. .......................................... 355/55; 355/57; 355/243

[58] Field of Search ........................ 355/55, 56, 57, 58, 355/59, 243

[56] References Cited

U.S. PATENT DOCUMENTS 4,917,460 4/1990 Yamada et al. .................. 355/56 X
4,954,863 9/1990 Harada et al. .................... 355/56 X

*Primary Examiner*—Richard A. Wintercorn
*Attorney, Agent, or Firm*—Cushman, Darby & Cushman

[57] ABSTRACT

In a magnification adjusting mechanism, preparatory movement position calculating means utilizes a current position where an optical system is positioned at present, and a target position for the optical system which corresponds to an aimed magnification inputted by a magnification inputting means, to calculate a preparatory movement position between the current position and said target position, and optical system drive control means controls optical system driving means in such a manner that, when a magnification is inputted by the magnification inputting means, the optical system is moved to a preparatory movement position calculated by the preparatory movement position calculating means, and that, when a final magnification is determined, the optical system is moved to the target position, whereby even when a magnification is set again because it is unacceptable, the optical system is quickly moved to the destination.

22 Claims, 7 Drawing Sheets

MAGNIFICATION ADJUSTING MECHANISM

BACKGROUND OF THE INVENTION

This invention relates to a magnification adjusting mechanism for moving an optical system to allow a copying machine or the like to change its magnification to less than 100%, 100% or more than 100%.

Heretofore, in copying an original at a magnification of more than 100% or less than 100% with a copying machine, first a magnification setting key on the operating panel of the copying machine is operated to set the magnification to a desired value, for instance 150%, and then a print key is depressed. When, in this operation, the magnification setting key is operated, immediately the optical system including lenses, mirrors, etc. is moved to a 150% magnification position to copy the original at the magnification of 150% thus set.

In a copying machine of the type that an original's size is automatically detected, its optical system is operated as follows: When an original document is placed on its contact glass plate, or when an original document cover is closed thereafter, the size of the original is automatically detected. A magnification to be used is automatically calculated from the size of the original document thus detected and the kind of a sheet supplying cassette selected, then the optical system is moved to a position corresponding to that calculated magnification.

Even if the magnification is set in this way, it is not always correct and sometimes it is necessary to further modify the magnification.

The conventional copying machine is designed so that when the magnification is set, by magnification inputting keys or by placing the original document on the contact glass plate or by closing the original document cover, the optical system is immediately moved to the position corresponding to the magnification determined. If there is a large distance between the current position and the target position of the optical system or the magnification needs to be modified, then the copying operation requires a lot of preparatory time.

SUMMARY OF THE INVENTION

In view of the foregoing, an object of this invention is to provide a magnification adjusting mechanism in which, even when a magnification is set again because it is not suitable, the optical system is quickly moved to the position corresponding to the new magnification thus set.

The foregoing object and other objects of the invention have been achieved by the provision of the following magnification adjusting mechanisms:

(1) A magnification adjusting mechanism which, according to a first aspect of the invention comprises: magnification inputting means for inputting a degree of magnification; preparatory movement position calculating means for calculating, based on first data indicative of a current position where an optical system is positioned at present, and second data indicative of a target position for said optical system which corresponds to said degree of magnification inputted by said magnification inputting means, a preparatory movement position between said current position and said target position from said first and second data; optical system driving means for moving said optical system; and optical system drive control means for producing control signals to first cause said optical system driving means to move said optical system to said preparatory movement position, then cause said optical system driving means to move said optical system to said target position.

In the magnification adjusting mechanism according to the first aspect of the invention, a magnification is inputted by the magnification inputting means, and the preparatory movement position calculating means utilizes the first data on the current position where the optical system is positioned at present and the second data on the target position for the optical system which corresponds to an aimed magnification inputted by the magnification inputting means, to calculate the preparatory movement position between the current position and the target position from the first and second data. The optical system drive control means outputs control signals so that, when a magnification is inputted by the magnification inputting means, the optical system is moved to the preparatory movement position calculated by the preparatory movement position calculating means, and that, when a final magnification is determined, the optical system is moved to the target position. The optical system driving means moves the optical system in response to the control signals outputted by the optical system drive control means.

(2) A magnification adjusting mechanisms which, according to a second aspect of the invention, comprises: magnification inputting means for inputting a degree of magnification; preparatory movement position storing means in which at least one predetermined magnification position between a minimum and maximum magnification range has been stored in advance; optical system driving means for moving said optical system; and optical system drive control means for producing control signals to first cause said optical system driving means to move said optical system to said predetermined magnification position stored in said preparatory movement position storing means, then cause said optical system driving means to move said optical system to said target position.

In the magnification adjusting mechanism according to the second aspect of the invention, as was described above, a predetermined position corresponding to a predetermined magnification between a maximum magnification and a minimum magnification has been stored in the preparatory movement position storing means in advance. The magnification inputting means is used to input a magnification. The optical system drive control means provides the control signals so that, when a magnification is inputted by the magnification inputting means, the optical system is moved to the preparatory movement position stored in the preparatory movement position storing means, and that, when a final magnification is determined, the optical system is moved to a position corresponding to the aimed magnification. The optical system driving means operates to move the optical system in response to the control signals outputted by the optical system drive control means.

(3) A magnification adjusting mechanism which, according to a third aspect of the invention, comprises: magnification inputting means for inputting a degree of magnification; border storing means for storing at least one border position corresponding to a predetermined magnification; preparatory movement position determining means for determining, based on first data indicative of a current position where an optical system is positioned at present, second data indicative of said border positions stored in said border storing means, and third data indicative of a target position for said optical system which corresponds to said degree of magnification inputted by said magnification inputting means, where said border position is located in relation to a target position; optical system driving means for moving said optical system; and optical system drive control means for producing control signals, based on said preparatory movement position determining means, which cause said optical system driving means to move said optical system to said border position first when said border position is in between said current position and said target position, otherwise cause said optical system driving means to move said optical system directly to said target position.

In the magnification adjusting mechanism according to the third aspect of the invention, as was described above, a border position corresponding to a predetermined magnification has been stored in the border storing means in advance. The magnification inputting means is used to input an aimed magnification. The preparatory movement position determining means first determines whether or not a predetermined border position is located in the space (L) between the current position where the optical system is positioned and a target position corresponding to the aimed magnification. The optical system drive control means outputs the control signals so that, in the case where the preparatory movement position determining means determines that the border position is not located in the space (L), the optical system is moved directly to the target position when a magnification is inputted by the magnification inputting means, and, in the case where the preparatory movement position determining means determines that the border position is located in the space (L), the optical system is moved to the border position when a magnification is inputted by the magnification inputting means, and then moved to the target position from the border position when a final magnification is determined. The optical system driving means is used to move the optical system in response to the control signals outputted by the optical system drive control means.

In each of the magnification adjusting mechanisms described above, the final magnification is determined by operating a magnification determination key for indicating the determination of a final magnification, or a start key for indicating the start of an image forming operation, or in the lapse of a predetermined period of time from the time instant that the magnification inputting means inputs a magnification.

That is, each of the magnification adjusting mechanisms may be so designed that the magnification inputted is determined as a final magnification when the magnification determining key additionally provided is operated, or when the start key is operated; or when a predetermined period of time has passed from the time instant that the magnification is inputted by the magnification inputting means.

The nature, utility and principle of the invention will be more clearly understood from the following detailed description and the appended claims when read in conjunction with the accompanying

BRIEF DESCRIPTION OF THE DRAWINGS

In the accompanying drawings.

The parts (a) through (c) of FIG. 8 are explanatory diagrams a description of the operation of the third embodiment of the invention.

DETAILED DESCRIPTION OF THE INVENTION

Preferred embodiments of this invention will be described with reference to the accompany drawings.

Figure 1:
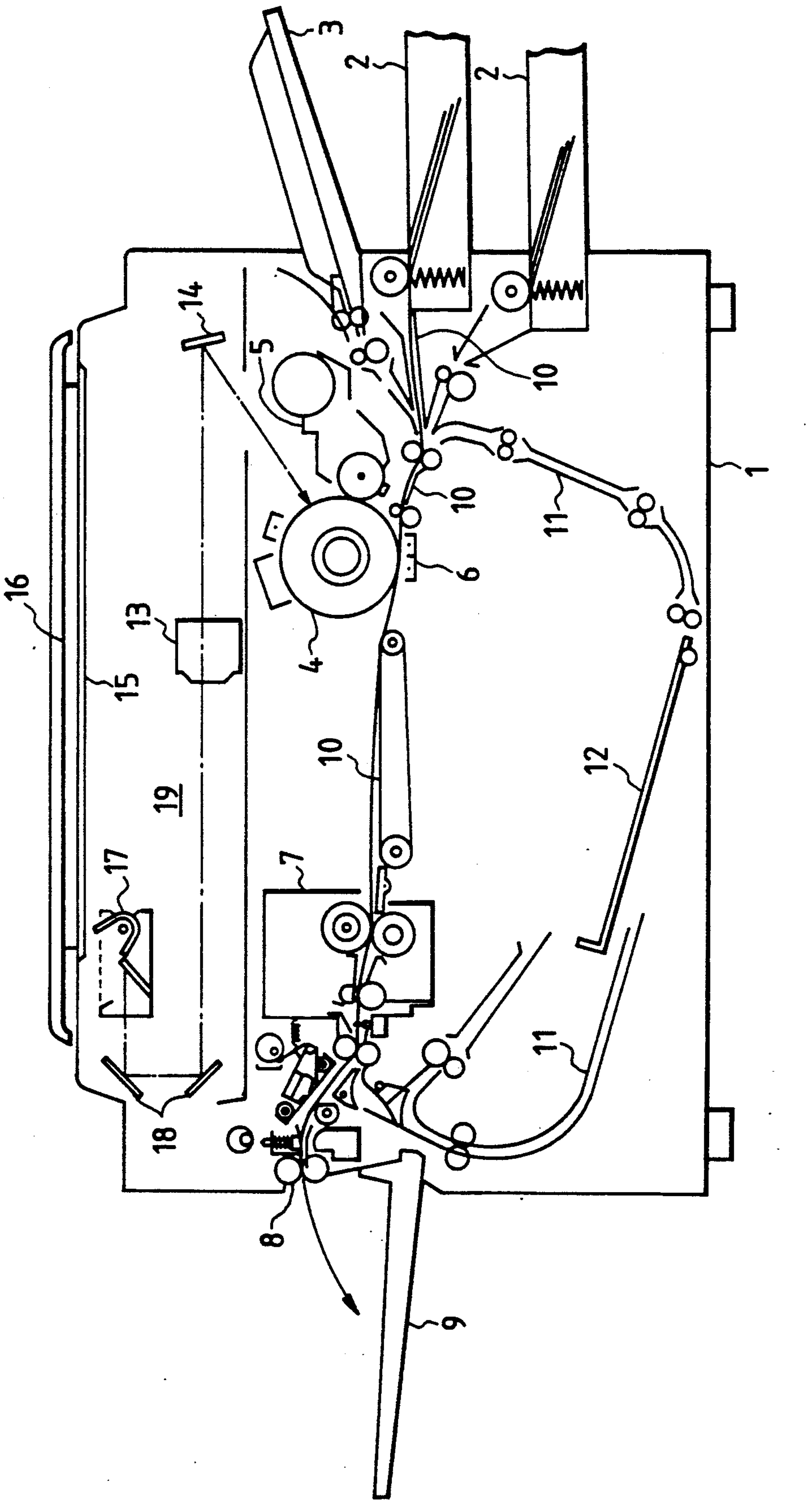
FIG. 1 is a sectional view showing the arrangement of a copying machine to which the technical concept of the invention is applied.

FIG. 1 is a sectional view outlining the arrangement of a copying machine including a magnification adjusting mechanism of the invention.

As shown in FIG. 1, sheet supplying cassettes 2 containing copying sheets of different sizes, and a manual sheet supplying tray 3 are provided upstream of the body 1 of the copying machine (in the direction of conveyance of a copying sheet). A photo-sensitive drum 4, which can rotate,is provided at the center of the machine body 1. A developing unit 5, and a transferring and separating unit 6 are provided around the photosensitive drum 4. A thermal fixing unit 7, a pair of sheet discharging rollers 8, and a sheet discharging tray 9 are provided downstream of the transferring and separating unit 6. In FIG. 1, reference numeral 10 designates a conveying path; reference 11 designates a sheet resupplying path; and reference 12 is an intermediate sheet supplying cassette.

A contact glass plate 15, which holds an original document in place by the use of the original document cover 16, are provided on the front portion of the upper surface of the machine body 1. An optical system 19 which comprises of an irradiating lamp 17, reflecting mirrors 18, lens 13 and a final reflecting mirror 14 is provided below the contact glass plate 15

Figure 2:
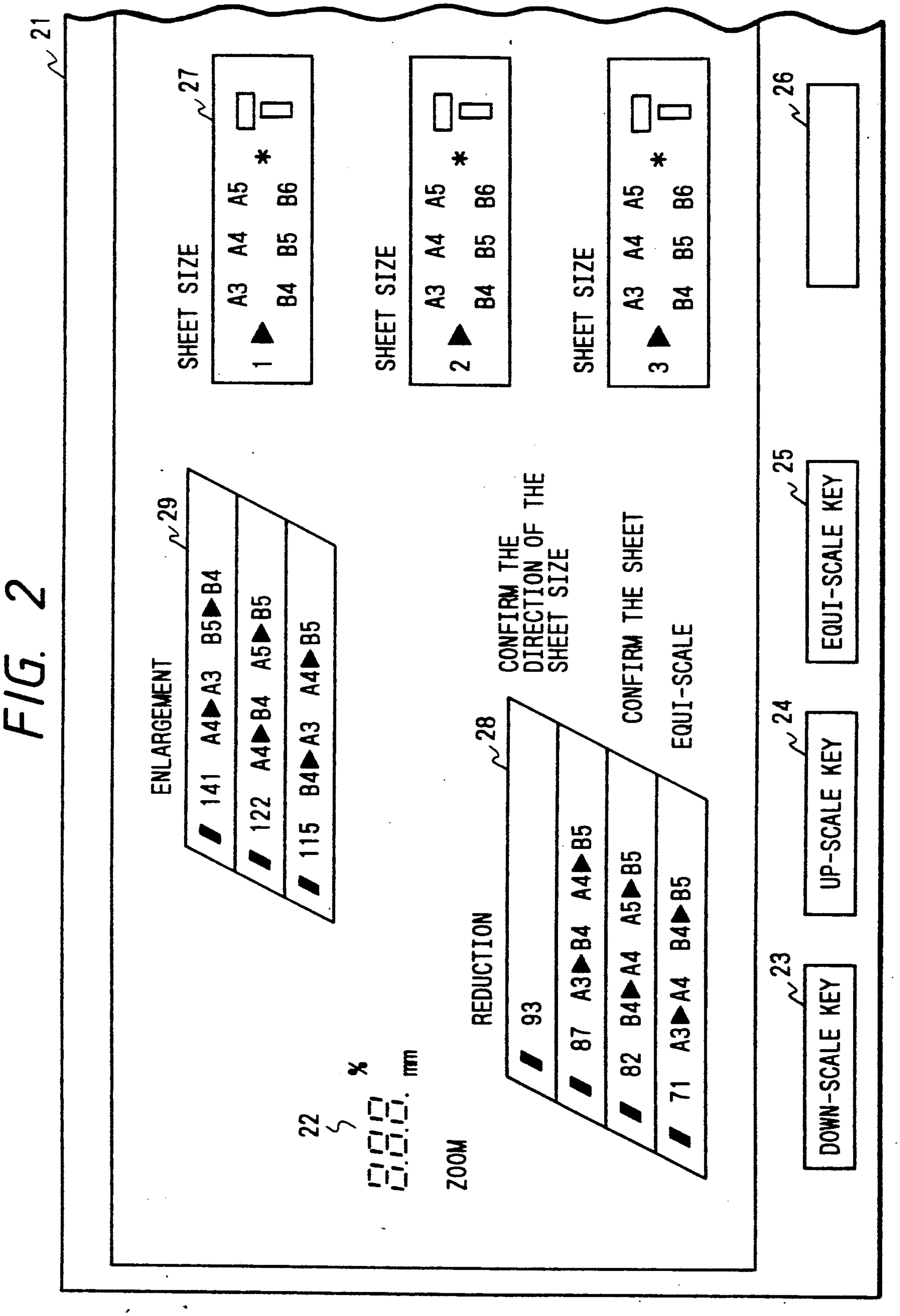
FIG. 2 is a plan view of the operating panel of the copying machine.

An operating panel 21 as shown in FIG. 2 is provided on the front portion of the upper surface of the machine body. The operating panel 21 has a reduction display section 28, an enlargement display section 29, a magnification display section 22, and a sheet size sections 27 for displaying the sizes of copying sheets in the sheet supplying cassettes 2. There are several keys on the operation panel 21: a down-scale key 23 for specifying a magnification of less than 100% or for decreasing the current magnification; an up-scale key 24 for specifying a magnification of more than 100% or for increasing the current magnification; an equi-scale key 25 for specifying a magnification of 100%; and a size key 26 for selecting one of the sheet sizes.

Figure 3:
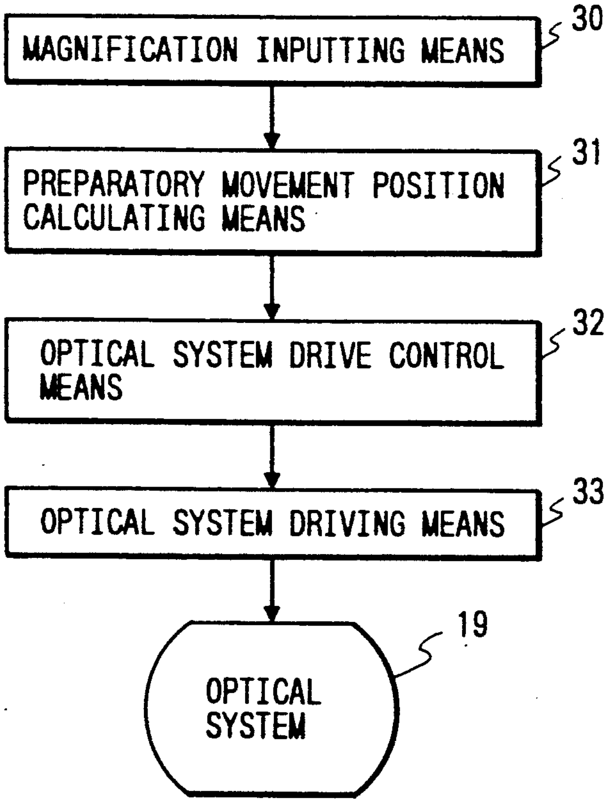
FIG. 3 is a block diagram showing an example of a magnification adjusting mechanism which constitutes a first embodiment of the invention.

FIG. 3 is a block diagram showing the arrangement of an example of a magnification adjusting mechanism which constitutes a first embodiment of the invention. That is, the magnification adjusting mechanism comprises magnification inputting means 30, preparatory movement position calculating means 31, optical system drive control means 32, and optical system driving means 33.

The magnification inputting means 30 comprises the above-described down-scale key 23, up-scale key 24 and equi-scale key 25, for inputting a desired magnification.

The preparatory movement position calculating means 31 first uses the input data on the current position where the optical system 19 is positioned (hereinafter referred to a "current position data", when applicable) and data on the target position which corresponds to a magnification inputted by the magnification inputting means 30 (hereinafter referred to as "target position data", when applicable). Then a preparatory movement position is calculated from the current position data and the target position data. For example, the optical system 19 is held at the position corresponding to a magnification of 100% or at the position corresponding to the magnification which was used in the previous copying operation, depending on the type of copying machine used. Prior to copying, the preparatory movement position calculating means 31 utilizes the current position data and the target position inputted to calculate a position between these two positions, for instance, the just middle position. The optical system drive control means 32 will use this information.

The optical system drive control means 32 operates as follows: after the preparatory movement position calculating means has finished, the optical system drive control means 32 produces a signal to move the optical system 19 to the preparatory movement position. When a magnification is finally determined (hereinafter referred to as "a final magnification", when applicable) by operating a print key (not shown) for starting a copying operation, the optical system drive control means 32 controls the optical system driving means 33 to move the optical system to the target position.

The optical system driving means 33 comprises an electric motor, gears, and chains, to move the optical system 19.

The operation of the copying machine thus constructed will be described.

Upon depression of the print key, the image of an original on the contact glass plate 15 is supplied to the photo-sensitive drum 4 by means of the optical system 19, so that a latent image is formed on the photo-sensitive drum. The latent image thus formed is developed with toner by the developing unit 5. Under this condition, the transferring and separating unit 6 operates to transfer the image thus developed onto a copying sheet conveyed from the sheet supplying cassette 2, and to separate the sheet from the photo-sensitive drum 4. The sheet thus separated is delivered through the conveying path 10 to the thermal fixing unit 7. Finally, the sheet thus processed is discharged into the sheet discharging tray 9 through the pair of sheet discharging rollers 8.

Thus, one copying operation has been accomplished. In this case, it is assumed that the optical system 19 is returned to the position corresponding to the magnification of 100%.

Figure 4:
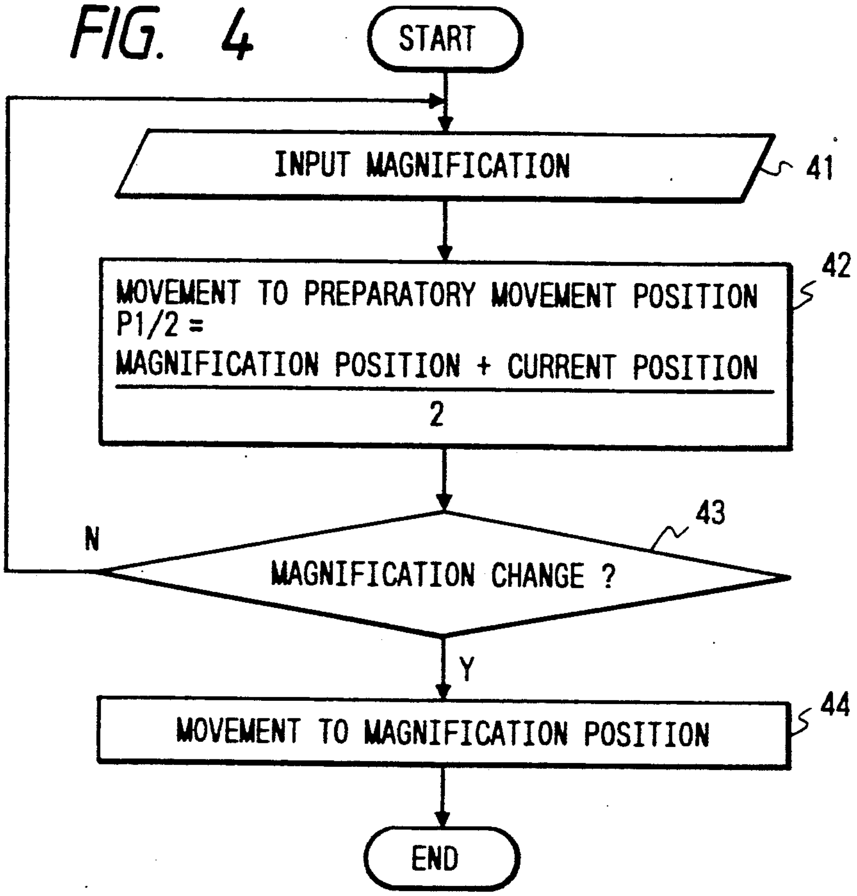
FIG. 4 is a flow chart for a description of the operation of the first embodiment of the invention.

Let us consider the case where another person operates the copying machine. First, he inputs a desired magnification with the down-scale key 23 or the up-scale key 24 as shown in FIG. 4 (Step 41). In response to this magnification inputting operation, the preparatory movement position calculating means 31 calculates the middle point between the current position of the optical system, i.e., the position corresponding to the magnification of 100%, and the position corresponding to the target magnification according to the following equation (Step 42):

$$\text{Preparatory movement position } P_{\frac{1}{2}} = \frac{[\text{Magnification postion} + \text{Current position}]}{2}$$

The optical system drive control means 32 controls the optical system driving means 33 to move the optical system 19 to the preparatory movement position $P_{\frac{1}{2}}$, thus calculated in step 42.

Thereafter, the operator, ensuring that the magnification thus set is correct, operates the start key. That is, by operating the start key, the magnification is established as a final magnification without change (Step 43). Thereupon, the optical system drive control means 32 controls the optical system drive means 33 to move the optical system 19 from the preparatory movement position $P_{\frac{1}{2}}$ to the target position (Step 44).

When, on the other hand, the operator has found that there is an incorrect magnification set, the start key is not operated (Step 43), and the correct magnification is set (Step 41 is effected again). As a result, a preparatory movement position $P_{\frac{1}{2}}$ is calculated (Step 42), and the optical system drive control means 32 controls the optical system drive means 33 to move the optical system 19 to the preparatory movement position $P_{\frac{1}{2}}$ (Step 42). In this operation, the optical system 19 is moved from the previous preparatory movement position $P_{\frac{1}{2}}$, (the current position) to the new preparatory movement position $P_{\frac{1}{2}}$, which is a relatively short distance of movement of the optical system 19. Thereafter, the start key is operated, and the optical system 19 is moved to the correct target position (Steps 43 and 44).

As was described above, in the magnification adjusting mechanism of the invention, the preparatory movement position calculating means utilizes the data on the current position and the target position of the optical system to calculate the preparatory position between those two positions, and the optical system drive control means operates to move the optical system to the preparatory movement position calculated by the preparatory movement position calculating means when a magnification is inputted by the magnification inputting means. Then the optical system drive means outputs a signal to move the optical system to the target position after determination of a final magnification. Hence, even if an unsuitable magnification is inputted, the movement of the optical system due to the subsequent change of magnification by the operator can be achieved in a short time.

Figure 5:
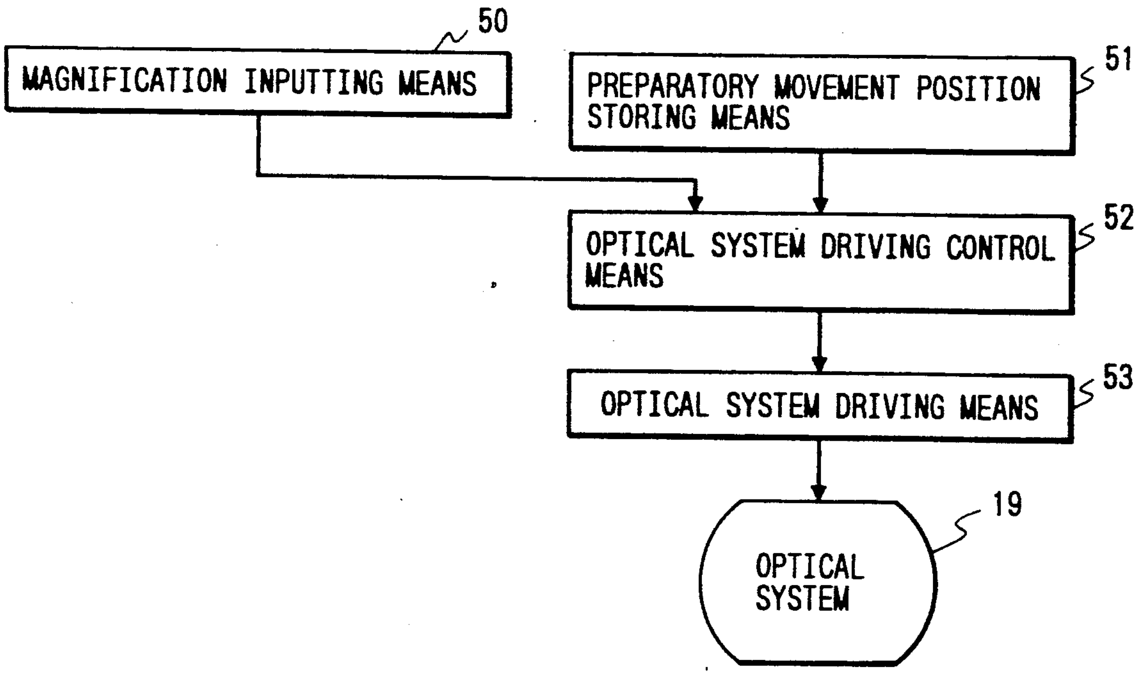
FIG. 5 is a block diagram showing another example of the magnification adjusting mechanism which constitutes a second embodiment of the invention.

FIG. 5 is a block diagram showing the arrangement of another example of the magnification adjusting mechanism which constitutes a second embodiment of the invention. The magnification adjusting mechanism comprises: magnification inputting means 50; preparatory movement position storing means 51; optical system drive control means 52; and optical system driving means 53.

The preparatory movement position storing means 51 is a memory means such as a RAM or ROM which has stored, in advance, a predetermined position corresponding to certain magnification between the maximum magnification and the minimum magnification of the copying mechanism. For instance, in this case of a copying machine having a range of magnifications from 50% to 200%, the preparatory movement position storing means 51 may have stored a position corresponding to a magnification of 80% in advance.

The magnification inputting means 50 comprises the above-described down-scale key 23, up-scale key 24 and equi-scale key 25, for inputting a desired magnification.

The optical system driving means 53 comprises an electric motor, gears and chains, to drive the optical system 19.

The optical system drive control means 52 operates as follows: When a magnification is inputted, for instance, with the down-scale key 23 of the magnification inputting means, the optical system driving control means 52 controls the optical system driving means 53 to move the optical system 19 to the predetermined position which has been stored in the preparatory movement position storing means 51. When the print key (not shown) for starting a printing operation is operated, i.e., when the magnification is determined as a final magnification, the optical system driving control means 52 controls the optical system driving means 53 to move the optical system 19 from the preparatory movement position, which was a predetermined position, to the target position.

The operation of the magnification adjusting mechanism, the second embodiment of the invention, will be described.

First, the operation of the printing machined equipped with the magnification adjusting mechanism will be described.

Upon depression of the print key, the image of an original on the contact glass plate 15 is applied to the photo-sensitive drum 4 by means of the optical system 19, so that a latent image is formed on the photo-sensitive drum. The latent image thus formed is developed with toner by the developing unit 5. Under this condition, the transferring and separating unit 6 operates to transfer the image thus developed onto a copying sheet conveyed from the sheet supplying cassette 2, and to separate the sheet from the photo-sensitive drum 4. The sheet thus separated is delivered through the conveying path 10 to the thermal fixing unit 7. Finally, the sheet thus processed is discharged into the sheet discharging tray 9 through the pair of sheet discharging rollers 8.

Thus, one copying operation has been accomplished. In this case, it is assumed that the optical system 19 is returned to the position corresponding to the magnification of 100%.

Figure 6:
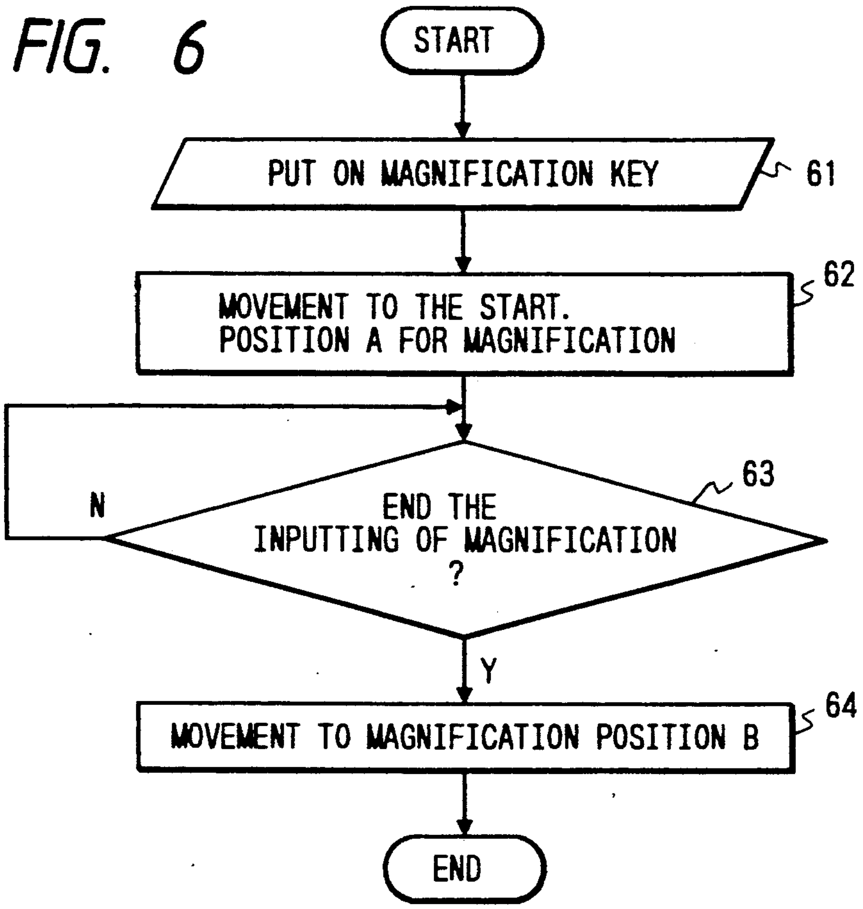
FIG. 6 is a flow chart for a description of the operation of the second embodiment of the invention.

Let us consider the case where another person operates the copying machine. First, he inputs a desired magnification with the down-scale key 23 or the up-scale key 24 as shown in FIG. 6 (Step 61). In response to this magnification inputting operation, the optical system drive control means 52 controls the optical system driving means 53 to move the optical system 19 to the predetermined preparatory movement position A stored in the preparatory movement position storing means 51 (Step 62).

Thereafter, the operator, ensuring that the magnification thus set is correct, operates the start key. That is, by operating the start key, the magnification is established as a final magnification without change (Step 63). Thereupon, the optical system drive control means 52 controls the optical system drive means 53 to move the optical system 19 from the predetermined preparatory movement position A to the target position B (Step 64).

When, on the other hand, the operator has found that the magnification set is unsuitable, the start key is not operated (Step 63) and a correct magnification is set. In this operation, the optical system 19 is held at the predetermined preparatory movement position A.

Thereafter, the start key is operated, and the optical system 19 is moved to the correct target position B (Steps 63 and 64).

A third embodiment of the invention will be described with reference to FIG. 7.

Figure 7:
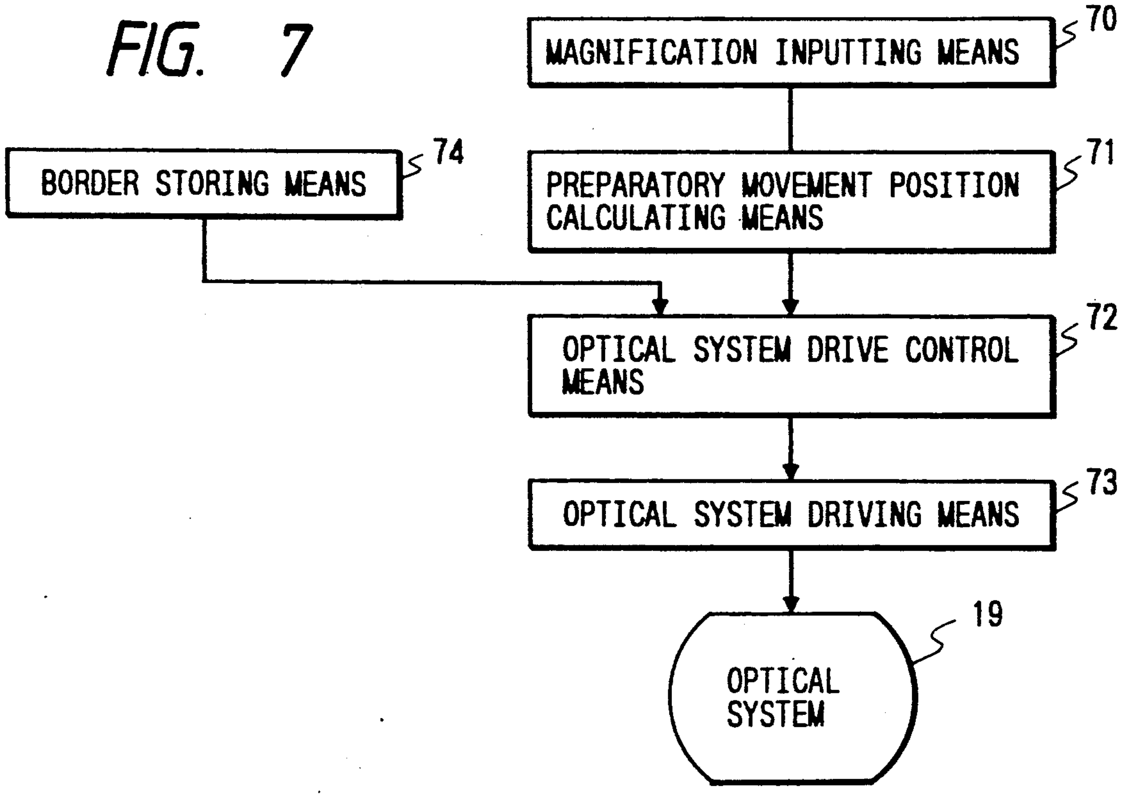
FIG. 7 is a block diagram showing another example of the magnification adjusting mechanism which constitutes a third embodiment of the invention.

The magnification adjusting mechanism, as shown in FIG. 7, comprises: magnification inputting means 70; a preparatory movement determining means 71; optical system drive control means 72; optical system driving means 73; and border storing means 74.

The border storing means 74 is memory means such as a RAM or ROM in which border positions corresponding to predetermined magnifications have been stored in advance. The expression "border position" as used herein is intended to mean two positions which divide into three equal parts the distance (or time) of movement of the optical system.

The magnification inputting means 70 includes the down-scale key 23, the up-scale key 24, and equi-scale key 25, for inputting a desired magnification.

Figure 8A:
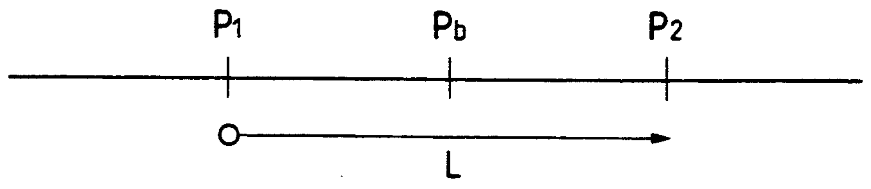
Figure 8B:
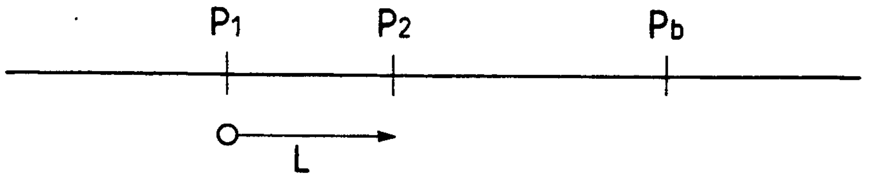
Figure 8C:
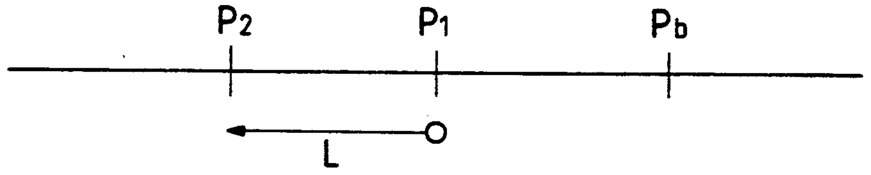

The preparatory movement determining means 71 utilizes the target magnification data inputted by the magnification inputting means 70 and the border position data stored in the border storing means 74, to determine whether or not a border position $P_b$ comes within the distance L between the current position $P_1$ where the optical system 19 is held at present and the final position $P_2$ corresponding to the target magnification. Part (a) of FIG. 8 shows the case where the border position $P_b$ is within the distance L. Parts (b) and (c) of FIG. 8 shows the case where the border position $P_b$ is not within the distance L. In the parts (a) through (c) of FIG. 8, the arrows indicate the directions of movement of the optical system 19.

The optical system driving means 73 comprises an electric motor, gears, chains, etc. to move the optical system 19.

The optical system drive control means 72 operates as follows: in the case where the preparatory movement position determining means determines that the border position $P_b$ does not lie in the distance L, the control means 72 outputs a signal to move the optical system 19 to the target position $P_2$ immediately when the magnification is inputted by the magnification inputting means 70. On the other hand, in the case where the preparatory movement position determining means 71 determines that the border position $P_b$ comes within the distance L, the optical system drive control means 72 outputs signals so that the optical system 19 is moved to the border position $P_b$. Then the optical system 19 is moved to the target position $P_2$ from the border position $P_b$ after the final magnification is determined.

Figure 9:
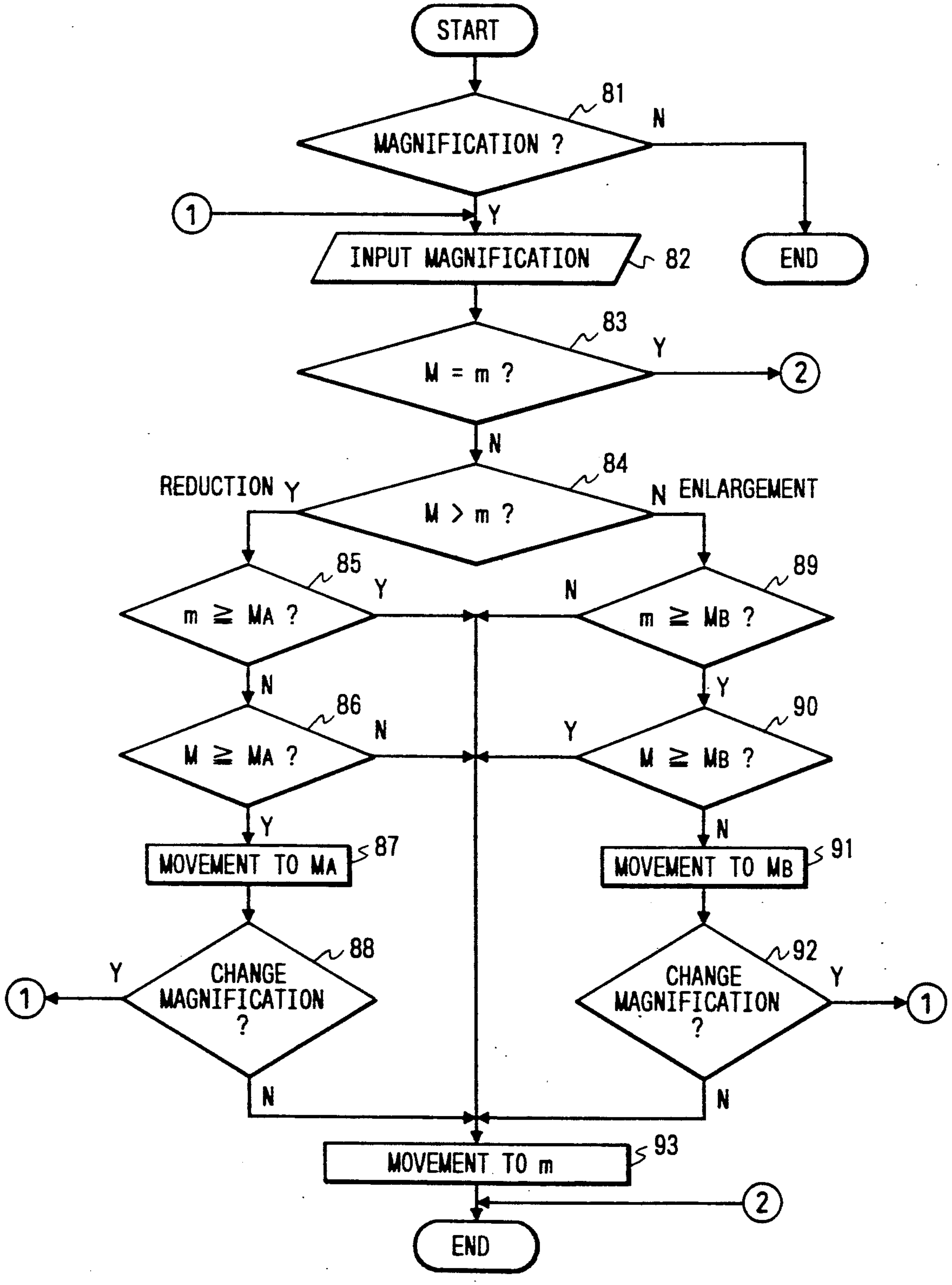
FIG. 9 is a flow chart for a description of the operation of the third embodiment of the invention.

The operation of the magnification adjusting mechanism, the third embodiment of the invention, will be described with reference to FIG. 9, a flow chart.

A border magnification $M_A$ for performing a copying operation at a magnification of less than 100% (hereinafter referred to as "a reducing border magnification", when applicable), and a border magnification $M_B$ for performing a copying operation at a magnification of more than 100% (hereinafter referred to as "an enlarging border magnification", when applicable) are stored in the border storing means 74 in advance.

The operator operates the magnification inputting means 70 to input a target magnification m (Steps 81 and 82). The preparatory movement position determining means 71 compares the target magnification m with the border magnifications $M_A$ and $M_B$and the magnification M corresponding to the current position of the optical system which was used in the previous copying operation, to determine whether or not the optical system must go through the border position. In response to the result of determination done by the preparatory movement position determining means 71, the optical system drive control means 72 controls the optical system driving means 73 to move the optical system.

When the current magnification M used in the previous copying operation is equal to the target magnification m, the optical system 19 is not moved (Step 83). When the current magnification M is different from the target magnification, these magnifications M and m are subjected to comparison (Step 84). In the case where the current magnification M is larger than the target magnification, the original is copied in reduced size.

If, in this case, the target magnification m is equal to or larger than the reducing border magnification $M_A$, the optical system 19 will not pass through the border position $P_b$, and therefore the optical system 19 is moved to the position corresponding to the target magnification m (Steps 85 and 93). If, on the other hand, the target magnification m is smaller than the border magnification $M_A$, and the current magnification M is also smaller than the border magnification $M_A$, the optical system 19 will not pass through the border position $P_b$, and therefore the optical system 19 is immediately moved to the position corresponding to the target magnification m (Steps 86 and 93).

In the case where the current magnification M is equal to or larger than the border magnification $M_A$ (Step 86), the optical system 19 must go through the border position $P_b$, and therefore it is moved to the border position $P_b$ (corresponding to the magnification $M_A$). When the final magnification is determined (Step 88), the optical system 19 is moved from the border position $P_b$ to the target position $P_2$ (Step 93).

In the case where the final magnification is not determined, and the magnification should be changed (Step 88), Step 82 is effected again.

When, in Step 84, the current magnification M is smaller than the target magnification, the original is copied in larger size.

If, in this case, the target magnification m is smaller than the enlarging border magnification $M_B$, the optical system 19 will not pass through the border position $P_b$, and therefore the optical system 19 is moved to the position corresponding to the target magnification m (Steps 89 and 93). On the other hand, in the case also where the target magnification m is equal to or larger than the enlarging border magnification $M_B$, and the current magnification M is also equal to or larger than the enlarging border magnification $M_B$, the optical system 19 will not pass through the border position $P_b$, and therefore the optical system 19 is moved to the position corresponding to the border position $P_b$ immediately (Steps 90 and 93).

When, on the other hand, the current magnification M is smaller than the border magnification $M_B$ (Step 90), the optical system 19 must go through the border position $P_b$, and therefore it is moved to the border position $P_b$ (corresponding to the magnification $M_B$ (Step 91)). When the final magnification is determined (Step 92), the optical system 19 is moved from the border position $P_b$ to the target position $P_2$ (Step 93).

When the final magnification is not obtained, and the magnification must be changed (Step 92), Step 82 is effected again.

In the above-described first and second embodiment of the invention, the preparatory movement position is at the middle of the distance between the current position and the target position; however, the invention is not limited thereto or thereby. That is, the preparatory movement position may be at any point between the current position and the target position.

Furthermore, in the above-described third embodiment of the invention, the border position is located at the points which divide the distance into three equal parts; however, the invention is not limited thereto or thereby. That is, it may be at the positions corresponding to popularly used magnifications such as 70% and 141%. In addition, it is not always necessary to divide the distance into three parts.

In the above-described embodiments, the final magnification is determined by depression of the start key; however, the invention is not limited thereto or thereby. That is, an additional key may be provided to indicate the fact that the final magnification is determined. Alternatively, the magnification adjusting mechanism may have means for regarding as the determination of a final magnification the lapse of a predetermined period of time from the time instant that a magnification is set by the magnification inputting means. That is, any means can be employed with which the operator determines that the magnification inputted will not be changed any longer, and the mechanism can read this determination.

In the above-described embodiments, the preparatory movement position calculating means, and the optical system drive control means are in the form of software using computers; however, the invention is not limited thereto or thereby. That is, they may be realized as hardware.

As was described above, in the magnification adjusting mechanism, the preparatory position or the border position is so utilized that, when a magnification is inputted by the magnification inputting means, the optical system drive control means output operates to move the optical system to the preparatory movement position or the border position or the target position as the case may be. Hence, when a magnification inputted should be changed because it is unacceptable, the time for which the optical system is moved as a result of the change of the magnification is minimized.

In addition, it is unnecessary to move the optical system a long distance at a time, which contributes to an improvement of the positional accuracy of the lens and the mirrors.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A magnification adjusting mechanism comprising:
magnification inputting means for inputting a degree of magnification;

preparatory movement position calculating means for calculating, based on first data indicative of a current position where an optical system is positioned at present, and second data indicative of a target position for said optical system which corresponds to said degree of magnification inputted by said magnification inputting means, said preparatory movement position between said current position and said target position from said first and second data;

optical system driving means for moving said optical system; and optical system drive control means for producing control signals, based on calculations from said preparatory movement position calculating means, to first cause said optical system driving means to move said optical system to said preparatory movement position, then cause said optical system driving means to move said optical system to said target position.

2. A mechanism as claimed in claim 1, wherein said magnification inputting means includes an up-scale key to increase desired magnification, a down-scale key to decrease desired magnification, and an equi-scale key for specifying a magnification of 100%.

3. A mechanism as claimed in claim 1, wherein said optical system driving means includes an electric motor, gears and chains.

4. A mechanism as claimed in claim 1, wherein said optical system includes an irradiating lamp, reflecting mirrors to reflect an image of an original document illuminated by said irradiating lamp, and a lens to concentrate said image of said original document onto a photosensitive drum.

5. A mechanism as claimed in claim 1, wherein said final magnification is determined by operating a start key for indicating the start of an image forming operation.

6. A mechanism as claimed in claim 1, wherein said final magnification is determined by operating a magnification determination key for indicating the start of an image forming operation.

7. A mechanism as claimed in claim 1, wherein said final magnification is determined after a predetermined period of time from the time that said magnification inputting means inputs a magnification.

8. A magnification adjusting mechanism comprising:

magnification inputting means for inputting a degree of magnification;

preparatory movement position storing means in which at least one predetermined magnification position between a minimum and maximum magnification range has been stored in advance;

optical system driving means for moving said optical system; and optical system drive control means for producing control signals, based on said preparatory movement position storing means, to first cause said optical system driving means to move said optical system to said predetermined magnification position stored in said preparatory movement position storing means, then cause said optical system driving means to move said optical system to said target position.

9. A mechanism as claimed in claim 8, wherein said preparatory movement position storing means comprises a memory which has stored therein said predetermined magnification positions.

10. A mechanism as claimed in claim 8, wherein said magnification inputting means includes an up-scale key to increase desired magnification, a down-scale key to decrease desired magnification, and an equi-scale key for specifying a magnification of 100%.

11. A mechanism as claimed in claim 8, wherein said optical system driving means comprises an electric motor, gears and chains.

12. A mechanism as claimed in claim 8, wherein said optical system includes an irradiating lamp, reflecting mirrors to reflect an image of an original document illuminated by said irradiating lamp, and a lens to concentrate said image of said original document onto a photosensitive drum.

13. A mechanism as claimed in claim 8, wherein said final magnification is determined by operating a start key for indicating the start of an image forming operation.

14. A mechanism as claimed in claim 8, wherein said final magnification is determined by operating a magnification determination key for indicating the start of an image forming operation.

15. A mechanism as claimed in claim 8, wherein said final magnification is determined after a predetermined period of time from the time that said magnification inputting means inputs a magnification.

16. A magnification adjusting mechanism comprising:

magnification inputting means for inputting a degree of magnification;

border storing means for storing at least one border position corresponding to a predetermined magnification;

preparatory movement position determining means for determining, based on first data indicative of a current position where an optical system is positioned at present, second data indicative of said border positions stored in said border storing means, and third data indicative of a target position for said optical system which corresponds to said degree of magnification inputted by said magnification inputting means, where said border position is located in relation to a said position;

optical system driving means for moving said optical system; and optical system drive control means for producing control signals, based on said preparatory movement position determining means, which cause said optical system driving means to move said optical system to said border position first when said border position is in between said current position and said target position, otherwise cause said optical system driving means to move said optical system directly to said target position.

17. A mechanism as claimed in claim 16, wherein said magnification inputting means includes an up-scale key to increase desired magnification, a down-scale key to decrease desired magnification, and an equi-scale key for specifying a magnification of 100%.

18. A mechanism as claimed in claim 16, wherein said optical system driving means includes an electric motor, gears and chains.

19. A mechanism as claimed in claim 16, wherein said optical system includes an irradiating lamp, reflecting mirrors to reflect an image of an original document illuminated by said irradiating lamp, and a lens to concentrate said image of said original document onto a photosensitive drum.

20. A mechanism as claimed in claim 16, wherein said final magnification is determined by operating a start key for indicating the start of an image forming operation.

21. A mechanism as claimed in claim 16, wherein said final magnification is determined by operating a magnification determination key for indicating the start of an image forming operation;

22. A mechanism as claimed in claim 16, wherein said final magnification is determined after a predetermined period of time from the time that said magnification inputting means inputs a magnification.

* * * * *